(12) United States Patent
Gerus et al.

(10) Patent No.: US 7,205,342 B2
(45) Date of Patent: Apr. 17, 2007

(54) POLY(ARYLENE ETHER) COMPOSITION AND METHOD OF MOLDING

(75) Inventors: Cynthia Gerus, Delmar, NY (US); Steven R. Klei, Guilderland, NY (US); Geoffrey Riding, Castleton, NY (US)

(73) Assignee: General Electric Company, Schenectady, NY (US)

( * ) Notice: Subject to any disclaimer, the term of this patent is extended or adjusted under 35 U.S.C. 154(b) by 519 days.

(21) Appl. No.: 10/723,198

(22) Filed: Nov. 26, 2003

(65) Prior Publication Data

US 2005/0080164 A1 Apr. 14, 2005

Related U.S. Application Data

(60) Provisional application No. 60/510,249, filed on Oct. 10, 2003.

(51) Int. Cl.
*C09D 5/29* (2006.01)

(52) U.S. Cl. .......................... 523/171; 525/64; 525/68; 525/132; 525/238

(58) Field of Classification Search .............. 523/171; 525/64, 68, 132, 238
See application file for complete search history.

(56) References Cited

U.S. PATENT DOCUMENTS

| | | | |
|---|---|---|---|
| 2,890,209 A | 6/1959 | Phillips et al. ............ 260/78.3 |
| 4,154,775 A | 5/1979 | Axelrod .................... 260/874 |
| 4,191,685 A | 3/1980 | Haaf et al. ............... 260/45.95 |
| 4,493,915 A | 1/1985 | Lohmeijer et al. ............ 524/87 |
| 4,543,391 A | 9/1985 | Kuribayashi et al. ......... 525/68 |
| 4,565,684 A | 1/1986 | Tibbetts et al. ........... 423/447.3 |
| 4,572,813 A | 2/1986 | Arakawa .................... 264/29.2 |
| 4,636,408 A | 1/1987 | Anthony et al. ............ 427/160 |
| 4,663,230 A | 5/1987 | Tennent ..................... 428/367 |
| 4,668,739 A | 5/1987 | Berdahl et al. ............. 525/132 |
| 4,692,490 A | 9/1987 | Abolins ..................... 524/371 |
| 4,703,083 A | 10/1987 | Giori et al. ................. 525/87 |
| 4,785,076 A | 11/1988 | Shu ............................. 524/91 |
| 4,816,289 A | 3/1989 | Komatsu et al. ......... 423/447.3 |
| 4,835,201 A | 5/1989 | Bopp ........................ 524/102 |
| 4,843,116 A | 6/1989 | Bopp ........................ 524/102 |
| 4,876,078 A | 10/1989 | Arakawa et al. ......... 423/447.3 |
| 4,945,131 A | 7/1990 | Ting ........................... 525/68 |
| 5,024,818 A | 6/1991 | Tibbetts et al. ............. 422/158 |
| 5,165,909 A | 11/1992 | Tennent et al. .......... 423/447.3 |
| 5,290,876 A | 3/1994 | Mishima et al. ............ 525/316 |
| 5,336,701 A | 8/1994 | Wildi et al. ................. 523/411 |
| 5,395,889 A | 3/1995 | Fujiguchi et al. ........... 525/148 |
| 5,412,048 A | 5/1995 | Longley et al. ............. 526/212 |
| 5,475,053 A | 12/1995 | Niessner et al. |
| 5,478,878 A | 12/1995 | Nagaoka et al. ............ 524/430 |
| 5,530,062 A | 6/1996 | Bradtke et al. ............... 525/65 |
| 5,536,780 A | 7/1996 | Bhatia et al. ................. 525/65 |
| 5,580,924 A | 12/1996 | Wildi et al. ................... 525/65 |
| 5,589,152 A | 12/1996 | Tennent et al. .......... 423/447.3 |
| 5,591,382 A | 1/1997 | Nahass et al. ............. 252/511 |
| 5,672,644 A | 9/1997 | Inoue ......................... 524/99 |
| 5,994,442 A | 11/1999 | Fujiguchi et al. ........... 524/417 |
| H1975 H | 7/2001 | Rosendale et al. .......... 523/171 |
| 6,476,128 B1 | 11/2002 | Berzinis ....................... 525/70 |
| 6,620,886 B2 | 9/2003 | Obrecht et al. ............. 525/191 |

FOREIGN PATENT DOCUMENTS

| | | |
|---|---|---|
| EP | 0 497 012 A | 8/1992 |
| EP | 0 558 265 B1 | 2/1993 |
| EP | 0 561 512 A | 9/1993 |
| EP | 0 590 847 A | 4/1994 |
| EP | 0 884 361 B1 | 5/1998 |
| GB | 2 043 083 | 3/1979 |
| WO | WO 93/19128 A | 9/1993 |
| WO | WO 01/25303 A | 4/2001 |

OTHER PUBLICATIONS

International Search Report Application No. PCT/US2004/028493; mailed Jun. 30, 2005.

*Primary Examiner*—Edward J. Cain
(74) *Attorney, Agent, or Firm*—Cantor Colburn LLP

(57) ABSTRACT

A low gloss thermoplastic composition comprises poly (arylene ether), a rubber-modified poly(alkenyl aromatic) resin and an acrylonitrile containing polymer gel.

51 Claims, No Drawings

POLY(ARYLENE ETHER) COMPOSITION AND METHOD OF MOLDING

CROSS REFERENCE TO RELATED APPLICATIONS

This application claims priority to Provisional Application No. 60/510,249 filed on Oct. 10, 2003, which is incorporated by reference herein.

BACKGROUND OF INVENTION

This disclosure relates to poly(arylene ether) compositions. In particular, the invention relates to poly(arylene ether)/polystyrene compositions.

There is an unprecedented demand for plastics having unique colors and looks. For example, cellular telephones having interchangeable plastic covers are now commonly available. These covers come in a variety of colors and/or special effects, giving consumers control over the aesthetic design of their phones. Many other injection molded plastic products used in applications such as, for example, computers, laptops, stereos, business equipment, automotive interiors, etc., would also benefit from having unique colors and looks. Color and a variety of aesthetic effects other angular metameric effects are produced in thermoplastic compositions through the use of visual effect additives.

The incorporation of visual effect additives can have a significant impact on a number of aesthetic and physical properties. The inclusion of visual effects additives can often decrease the impact strength of the material. Additionally, the incorporation of visual effect additives can result in visible flowlines, knitlines or weldlines in the finished product. Such flowlines, knitlines or weldlines can produce unattractive streaks in the product. Flowlines, knitlines and/or weldlines are more visible in articles having a high gloss finish. Similarly, fingerprints and other contact related blemishes (resulting from handling) are more apparent on articles having a high gloss finish.

In the past desired aesthetic effects such as low gloss were frequently achieved through the use of coatings, texturization or similar surface oriented technology. Unfortunately coatings can scratch, flake or delaminate, having a negative effect on the aesthetics of the article. Additionally coatings and texturization can decrease the visual impact of the visual effect additive and usually require additional processing steps with a concomitant increase in manufacturing costs and in some cases a potentially negative impact on the environment.

Accordingly, there is a need in the art for low gloss plastic compositions, particularly low gloss plastic compositions containing visual effect additives and having excellent impact strength.

BRIEF DESCRIPTION OF THE INVENTION

The above described need is met by a low gloss thermoplastic composition comprising poly(arylene ether), rubber-modified poly(alkenyl aromatic) resin and acrylonitrile containing polymer gel.

In another embodiment, a method of making a low gloss thermoplastic article comprises molding a thermoplastic composition comprising poly(arylene ether), rubber-modified poly(alkenyl aromatic) resin, and optional acrylonitrile containing polymer gel at a melt temperature less than or equal to about 315° C., wherein after molding the article has a 60° gloss value of less than or equal to about 60% in the absence of texturization.

DETAILED DESCRIPTION

The low gloss thermoplastic composition comprises poly(arylene ether), rubber-modified poly(alkenyl aromatic) resin and acrylonitrile containing polymer gel. The low gloss composition may optionally comprise polysiloxane microspheres. The polymer gel may be added to the composition in a masterbatch. In some embodiments the low gloss composition further comprises at least one visual effects additive and depending upon the choice of the visual effects additive, the composition can achieve a brushed metal appearance. After molding the composition has a 60° gloss value of less than or equal to about 60%, preferably less than or equal to about 50% and more preferably less than or equal to about 30%. The low gloss value reduces the visibility of flowlines, knitlines and weldlines in the molded project as well as the appearance of temporary surface blemishes such as fingerprints. Additionally, compositions containing visual effects additives have impact strength comparable to similar compositions that do not contain visual effects additives.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

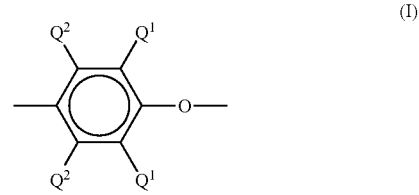

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) generally has a number average molecular weight of about 3,000–40,000 atomic mass units (amu) and a weight average molecular weight of about 20,000–80,000 amu, as determined by gel permeation chromatography. The poly(arylene ether) may have an intrinsic viscosity of about 0.10 to about 0.60 deciliters per gram (dl/g), preferably about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

Based upon the foregoing, it will be apparent to those skilled in the art that the contemplated poly(arylene ether) resin may include many of those poly(arylene ether) resins presently known, irrespective of variations in structural units or ancillary chemical features.

The composition comprises poly(arylene ether) in amounts of about 5 to about 95 weight percent, based on the total weight of the composition. Within this range, the composition may comprise less than or equal to about 85, preferably less than or equal to about 80 and more preferably less than or equal to about 75 weight percent poly(arylene ether). Also within this range the composition may comprise greater than or equal to about 20, preferably greater than or equal to about 25, and more preferably greater than or equal to about 30 weight percent poly(arylene ether).

The composition comprises a rubber-modified poly(alkenyl aromatic) resin. A rubber-modified poly(alkenyl aromatic) resin comprises a polymer derived from at least one of alkenyl aromatic monomer wherein the alkenyl aromatic monomer has the formula

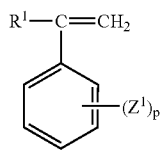

wherein $R^1$ is hydrogen, lower alkyl or halogen; $Z^1$ is vinyl, halogen or lower alkyl; and p is from 0 to 5. Preferred alkenyl aromatic monomers include styrene, chlorostyrene, and vinyltoluene. The rubber modified poly(alkenyl aromatic) resin further comprises a rubber modifier in the form of a blend and/or a graft. The rubber modifier may be a polymerization product of at least one $C_4$–$C_{10}$ nonaromatic diene monomer, such as butadiene or isoprene. The rubber-modified poly(alkenyl aromatic) resin comprises about 70 to about 95 weight percent of the poly(alkenyl aromatic) resin and about 5 to about 30 weight percent of the rubber modifier, preferably about 75 to about 90 weight percent of the poly(alkenyl aromatic) resin and about 10 to about 25 weight percent of the rubber modifier.

Highly preferred rubber-modified poly(alkenyl aromatic) resins include the styrene-butadiene copolymers containing about 75 to about 85 weight percent of the poly(alkenyl aromatic) resin and about 15 to about 25 weight percent of the rubber modifier. These styrene-butadiene copolymers, also known as high-impact polystyrenes, are commercially available as, for example, GEH 1897 from General Electric Company, and BA 5350 from Chevron Chemical Company.

In some embodiments it is preferable for the rubber-modified poly(alkenyl aromatic) resin to be comprised of a particulate rubbery phase in which the average size of the rubbery particles is about 0.5 to about 4.0 micrometers in diameter.

The composition comprises rubber-modified poly(alkenyl aromatic) resin in amounts of about 5 to about 95 weight percent, based on the total weight of the composition. Within this range, the composition may comprise less than or equal to about 85, preferably less than or equal to about 80 and more preferably less than or equal to about 75 weight percent rubber-modified poly(alkenyl aromatic) resin. Also within this range the composition may comprise greater than or equal to about 15, preferably greater than or equal to about 20, and more preferably greater than or equal to about 25 weight percent rubber-modified poly(alkenyl aromatic) resin.

The acrylonitrile containing polymer gel is made by melt compounding a acrylonitrile polymer with about 0.01 to about 10 weight percent of a polyepoxide based on the total weight of the acrylonitrile polymer and an acid catalyst such as $Ti(OR)_4$, $RSO_3H$, mineral acid, $BF_3$, amine, or zinc halide to form acrylonitrile gels. The gelation products may then be admixed with a small amount of water to reduce the yellowness of the gelation product. The acrylonitrile polymers may be based on one or more of the following: acrylonitrile or substituted acrylonitrile either alone or in combination with monovinylaromatic compounds, methacrylic acid esters of $C_1$–$C_4$ aliphatic alcohols, and/or imidized maleic anhydride derivatives which are unsubstituted or substituted with an alkyl or aryl group. Examples of these acrylonitrile copolymers include copolymers of acrylonitrile or substituted acrylonitrile with one or more of the $C_1$–$C_4$ acrylates, styrene, and/or alpha-methylstyrene, and the like. Preferably the acrylonitrile copolymer comprises at least about 5% by weight, more preferably at least about 15% by weight, and most preferably at least about 20% by weight acrylonitrile monomer based on the total weight of the acrylonitrile polymer. In one embodiment the polymer gel comprises about 20 to about 30% by weight acrylonitrile monomer and about 70 to about 80% by weight styrene monomer, based on the total weight of the acrylonitrile polymer. The acrylonitrile polymers and copolymers may be prepared by emulsion, bulk, suspension, bulk-suspension or solution polymerization methods which are well known in the art. Such acrylonitrile copolymers may also be rubber modified, for example, acrylonitrile-butadiene-styrene (ABS), acrylonitrile-EPDM (ethylene-propylene-diene monomer)-styrene (AES) and acrylate-styrene-acrylonitrile (ASA) resins. Preferably, the acrylonitrile polymers comprise less than 1 percent by weight rubber based on the total weight of acrylonitrile polymer, and more preferably are free of rubber. The polyepoxide preferably comprises a diepoxide. Various diepoxides are described in U.S. Pat. No. 2,890,209.

The polymer gel is preferably about 0.1 to about 5% crosslinked, more preferably about 0.2 to about 2% crosslinked. Additionally the polymer gel or polymer gel masterbatch, as described below, preferably have a particle size of about 0.5 to about 50 micrometers, more preferably about 1 to about 10 micrometers.

The polymer gel comprising is preferably blended with a matrix resin such as polystyrene or polycarbonate to form a masterbatch. Polycarbonate is preferred due to a greater effect on the gloss of the molded article and is derived from the reaction of carbonic acid derivatives with aromatic, aliphatic, or mixed diols. Polycarbonate may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially and preferred herein is bisphenol A polycarbonate, a polycarbonate that can be made by reacting bisphenol A with phosgene by condensation. Also preferred are blends of bisphenol A polycarbonate with homopolymers and/or copolymers of brominated bisphenol A polycarbonate.

The masterbatch may contain the matrix resin and polymer gel in a weight ratio of about 25:75 to about 75:25 respectively with a weight ratio of about 50:50 preferred.

The composition may comprise the polymer gel masterbatch in an amount of about 1 to about 15 weight percent, based on the total weight of the composition. Within this range, the composition may comprise less than or equal to about 12, preferably less than or equal to about 10 and more preferably less than or equal to about 7 weight percent polymer gel masterbatch. Also within this range the composition may comprise greater than or equal to about 2, preferably greater than or equal to about 3, and more preferably greater than or equal to about 4 weight percent polymer gel masterbatch.

The optional polysiloxane microspheres typically have a diameter less than or equal to 100 micrometer size and comprise polysiloxanes. In one embodiment the polysiloxane microspheres comprise polymethyl silsesquioxane and have a size distribution of about 0.5 to about 10 micrometers. Preferred polysiloxane microspheres comprise polymethyl silsesquioxane and are commercially available under the tradename Tospearl from General Electric, Pittsfield, Mass.

When employed the polysiloxane microspheres are present in an amount of about 0.5 to about 10 weight percent, based on the total weight of the composition. Within this range, the microspheres may be present in amount greater than or equal to about 1.0, preferably greater than or equal to about 2 weight percent. Also within this range, the microspheres may be present in an amount less than or equal to about 9, preferably less than on equal to about 8 weight percent.

The composition may comprise one or more visual effects additives, sometimes known as visual effects pigments. The visual effects additives may be present in an encapsulated form, a non-encapsulated form, or laminated to a particle comprising polymeric resin. Some non-limiting examples of visual effects additives are aluminum, aluminum flake, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and pigment coated glass flakes. The visual effect additive may have a high or low aspect ratio and may comprise greater than 1 facet.

Useful dyes and colorants include Perylene Red, Solvent Blue 35, Solvent Blue 36, Disperse Violet 26, Solvent Green 3, Amaplast Orange LFP, Perylene Red, Morplas Red 36, Pigment White 6, Pigment Red 101, Pigment Yellow 138, Solvent Violet 13, rare earth aluminates (luminescent pigments), organic interference pigments, and interference pigments based on lamellar structures. Fluorescent dyes may also be employed including, but not limited to, Permanent Pink R (Color Index Pigment Red 181, from Clariant Corporation), Hostasol Red 5B (Color Index #73300, CAS # 522-75-8, from Clariant Corporation) and Macrolex Fluorescent Yellow 10GN (Color Index Solvent Yellow 160:1, from Bayer Corporation). It is also contemplated that pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Angular metameric pigment, pigments which change color depending on the viewing angle, may also be employed. Hard particulate pigments that remain discrete during compounding and/or blending may also be used. As readily appreciated by one of ordinary skill in the art, it may be desirable to employ combinations of visual effects additives in order to achieve the desired aesthetic effect.

Preferred visual effect additives include aluminum flake and mica and even more preferred are high aspect ratio aluminum flake, mica or combinations thereof. In some embodiments, it is preferred for the aluminum flake and/or mica to have an average size of about 5 to about 300 micrometers, preferably 5 to about 100 micrometers and more preferably 5 to about 50 micrometers.

The composition may comprise at least one visual effect additive in an amount of about 0.1 to about 10 weight percent, based on the total weight of the composition. Within this range, the composition may comprise less than or equal to about 5, preferably less than or equal to about 3 and more preferably less than or equal to about 2 weight percent visual effect additive. Also within this range the composition may comprise greater than or equal to about 0.2, preferably greater than or equal to about 0.3, and more preferably greater than or equal to about 0.4 weight percent visual effect additive.

The composition may further comprise one or more reinforcing agents, including low-aspect ratio fillers, fibrous fillers, and polymeric fillers. Non-limiting examples of fillers include silica powder, such as fused silica, crystalline silica, natural silica sand, and various silane-coated silicas; talc, including fibrous, modular, needle shaped, and lamellar talcs; glass spheres, both hollow and solid, and surface-treated glass spheres; kaolin, including hard, soft, and calcined kaolin; mica, including metallized mica and mica surface treated with aminosilanes or acryloylsilanes coatings to impart good physicals to compounded blends; feldspar and nepheline syenite; silicate spheres; cenospheres; fillite; aluminosilicate (armospheres), including silanized and metallized aluminosilicate; quartz; quartzite; perlite; Tripoli;

diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; graphite, such as graphite powder; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, corn, rice grain husks; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, fibers from mixed oxides of aluminum, boron and silicon; single crystal fibers or "whiskers" including silicon carbide fibers, alumina fibers, boron carbide fibers, iron fibers, nickel fibers, copper fibers; glass fibers, including textile glass fibers such as E, A, C, ECR, R, S, D, and NE glasses, and quartz; vapor-grown carbon fibers include those having an average diameter of about 3.5 to about 500 nanometers as described in, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.; and the like. Some reinforcing agents may also function as visual effect additives and some visual effect additives may also function as reinforcing agents.

Additionally, the composition may optionally also contain various additives, such as antioxidants, mold release agents, UV absorbers, stabilizers such as light stabilizers and others, lubricants, plasticizers, anti-static agents, blowing agents, flame retardants and combinations of two or more of the foregoing.

Flame retardants include organic phosphates; zinc borate in combination with magnesium hydroxide; and boron phosphate in combination with amine functionalized silicone fluids. The organic phosphate class of materials are generally preferred. The organic phosphate is preferably an aromatic phosphate compound of the formula (II):

where each occurrence of R may be the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenyl-bisneopentyl phosphate, phenyl-bis (3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis(2, 5,5'-trimethylhexyl) phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula (III), (IV), or (V) below:

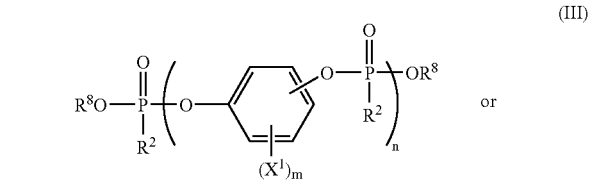

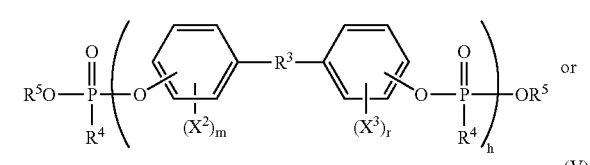

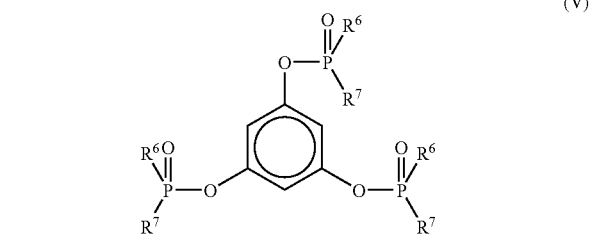

including mixtures thereof, in which $R^8$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and h are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another group of useful flame retardants include certain cyclic phosphates, for example, diphenyl pentaerythritol diphosphate, as a flame retardant agent for polyphenylene ether resins, as is described by Axelrod in U.S. Pat. No. 4,154,775.

Preferred phosphate flame retardants include those based upon resorcinol such as, for example, resorcinol tetraphenyl diphosphate, as well as those based upon bis-phenols such as, for example, bis-phenol A tetraphenyl diphosphate. Also preferred are the aforementioned piperazine-type phosphoramides. Phosphates containing substituted phenyl groups are also preferred. In an especially preferred embodiment, the organophosphate is selected from the group consisting of butylated triphenyl phosphate ester, resorcinol tetraphenyl diphosphate, bis-phenol A tetraphenyl diphosphate, and mixtures containing at least one of the foregoing.

Halogenated materials may also be a useful class of flame retardants. These materials are preferably aromatic halogen compounds and resins of the formula (VI):

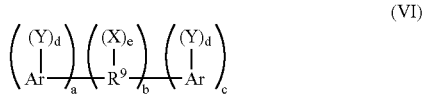

(VI)

wherein $R^9$ is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of either oxygen ether; carbonyl; amine; a sulfur containing linkage, e.g., sulfide, sulfoxide, sulfone; a phosphorus containing linkage; etc. $R^9$ can also consist of two or more alkylene or alkylidene linkages connected by such groups as aromatic, amino, ether, carbonyl, sulfide, sulfoxide, sulfone, a phosphorus containing linkage, etc. Other groups which are represented by $R^9$ will occur to those skilled in the art, including those found in U.S. Pat. Nos. 4,692,490 and 4,191,685.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl nucleus.

X is a monovalent hydrocarbon group exemplified by the following: alkyl, such as methyl, ethyl, propyl, isopropyl, butyl, decyl, etc; aryl groups, such as phenyl, naphthyl, biphenyl, xylyl, tolyl, etc; aralkyl groups such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dichromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane 2,2 bis-(3-bromo-4-hydroxyphenyl)-propane.

The preparation of these and other applicable bisphenols is known in the art. They are most commonly prepared by condensation of two moles of a phenol with a single mole of a ketone or aldehyde. In place of the divalent aliphatic group in the above examples may be substituted oxygen, sulfur, sulfoxy, etc.

Included within the above structural formula are: 1,3-dichlorobenzene, 1,4-dibrombenzene, 1,3-dichloro-4-hydroxybenzene and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as, for example, a copolycarbonate of bisphenol A and tetrabromobisphenol A and a carbonate precursor, e.g., phosgene. Metal synergists, e.g., antimony oxide, may also be used with the flame retardant.

The composition may comprise flame retardant in an amount of about 2 to about 40 weight percent, based on the total weight of the composition. Within this range, the composition may comprise greater than or equal to about 5 and preferably greater than or equal to about 8 weight percent flame retardant. Also within this range the composition may comprises less than about 30 and preferably less than or equal to about 20 weight percent flame retardant, based on the total weight of the composition.

The components of the composition are blended under conditions suitable for the production of an intimate blend. The components may be blended using a high shear device such as an extruder. The dry ingredients may be premixed before combining with the other ingredients or may be added at the feedthroat of the extruder. When employing particulate additives such as aluminum flake or glass fiber it may be advantageous to add the particulate additives downstream to prevent or limit breakage. It may also be advantageous to add particulate additives as a melt or masterbatch to improve dispersal and reduce dust. The composition may be formed into an article or into pellets for later processing.

Surprisingly it was found that compositions comprising poly(arylene ether), a rubber-modified poly(alkenyl aromatic) resin, an optional low gloss additive, and an optional visual effects additive can be molded into articles having a low gloss by molding the composition using a melt temperature less than or equal to about 290° C., preferably less than or equal to 277° C. The mold temperature is preferably less than or equal to about 90° C., more preferably less than or equal to about 80° C. The resulting article has a 60° gloss value of less than or equal to about 60%, preferably less than or equal to about 50%, and more preferably less than or equal to about 30%. These gloss values reflect molding in a smooth mold (no texturization).

Compositions containing a flame retardant may be molded using a melt temperature less than or equal to about 221° C., usually about 193 to about 221° C. The mold temperature is preferably less than or equal to about 65° C., more preferably less than or equal to about 55° C. The resulting article has a 60° gloss value of less than or equal to about 60%, preferably less than or equal to about 50%, and more preferably less than or equal to about 30%. These gloss values reflect molding in a smooth mold (no texturization).

In another embodiment, compositions comprising poly(arylene ether), rubber-modified poly(alkenyl aromatic) resin and polymer gel can be molded into articles having a low gloss by molding the composition at a melt temperature of about 260 to about 315° C. The mold temperature is preferably less than or equal to about 90° C., more preferably less than or equal to about 80° C. The resulting article has a 60° gloss value of less than or equal to about 60%, preferably less than or equal to about 50%, and more preferably less than or equal to about 30%. These gloss values reflect molding in a smooth mold (no texturization).

In compositions containing fire retardant and polymer gel, the melt temperature useful for molding is about 204° C. to about 232° C. The mold temperature is preferably less than or equal to about 65° C., more preferably less than or equal to about 55° C. These gloss values reflect molding in a smooth mold (no texturization).

In some embodiments the injection velocity can affect the gloss value of the molded part. It is preferable to employ an injection velocity of less than or equal to about 10.2 centimeters per second, more preferably less than or equal to about 5.1 centimeters per second and most preferably less than or equal to about 2.5 centimeters per second.

For low gloss articles having a 60° gloss of less than or equal to about 30%, gloss measurements can have a higher standard deviation than 60° gloss values greater than about 30%. In these cases, values with lower standard deviation can be obtained by measuring the gloss level at 85°. The compositions described herein have an 85° gloss value less than or equal to about 95%, preferably less than or equal to about 70%, and more preferably less than or equal to about 65%.

The invention is further illustrated by the following non-limiting examples.

EXAMPLES

The following examples were made using the materials listed in Table 1.

| Component | Description/Tradename/Supplier |
|---|---|
| HIPS II | A rubber modified poly(alkenyl aromatic resin) having a polybutadiene content of 10.5 weight percent. It is commercially available from GE Plastics. |
| HIPS III | A rubber modified poly(alkenyl aromatic) resin having a polybutadiene content of 22.4 weight percent. It is commercially available from GE Huntsman and Chevron. |
| PC SAN | A polycarbonate based masterbatch of acrylonitrile containing polymer gel containing 50 weight percent polycarbonate and 50 weight percent acrylonitrile containing polymer gel based on the total weight of the masterbatch |
| RDP | Resorcinol disphosphate |
| PPO | Poly(2,6-dimethyl-1,4-phenylene ether) having an intrinsic viscosity of 0.4 to 0.5 deciliters/gram as measured in chloroform at 25° C. |

Examples 1–6

Compositions were made according to the formulations shown in Table 2 with values in parts per hundred parts of poly(arylene ether) and rubber modified poly(alkenyl aromatic) resin. Aluminum flake (nominal median particle size of 18 micrometer) was added as a polystyrene masterbatch comprising 75 weight percent polystyrene and 25 weight percent aluminum flake based on the total weight of the masterbatch. Weights shown in Table 2 reflect the weight of the aluminum only. The composition additionally contained less than 3 weight percent additives (stabilizers, mold release agents, etc.).

The compositions were molded into two inch (5.1 centimeters) by three inch (7.6 centimeters) plaques using the following molding conditions. Molding conditions I: melt temp=288° C.; mold temp=77° C. Molding conditions II: melt temp=299° C.; mold temp=88° C. Molding conditions III: melt temp=321° C.; mold temp=88° C. The plaques were then measured for gloss level at 60° using a BYK Gardner Haze/Gloss instrument. The compositions were also tested for Notched Izod strength according to ASTM D256. Data is shown in Table 2. Notched Izod values are in Joules per meter.

TABLE 2

| | 1* | 2 | 3 | 4 | 5 | 6 |
|---|---|---|---|---|---|---|
| PPO | 50 | 50 | 50 | 50 | 50 | 50 |
| HIPS II | 50 | 50 | 25 | 25 | 0 | 0 |
| HIPS III | 0 | 0 | 25 | 25 | 50 | 50 |
| Al | 0.5 | 0.5 | 0.5 | 0.5 | 0.5 | 0.5 |
| PC SAN | 0 | 5 | 2 | 5 | 2 | 5 |
| 60° gloss at molding conditions I | 29.8 | 11.4 | 19.6 | 11.9 | 14.3 | 12.8 |
| 60° gloss at molding conditions II | 25.8 | 22.3 | 21 | 18.8 | 22.7 | 13.8 |
| 60° gloss at molding conditions III | 80.3 | 52.7 | 60 | 33 | 32.7 | 45.9 |
| Notched Izod | 144 | 102 | 134 | 112 | 150 | 134 |

*Comparative Examples

The addition of acrylonitrile containing polymer gel resulted in a significant drop in gloss particularly at high temperature molding conditions. The use of a rubber-modified poly(alkenyl aromatic) resin having a polybutadiene content of 22.4 weight percent showed an even greater decrease in gloss. Notably, low gloss can be obtained even when subjecting the compositions to melt temperatures greater than 315° C.

Examples 7–9

Compositions were made according to the formulations shown in Table 3 with values in parts per hundred parts of poly(arylene ether) and rubber modified poly(alkenyl aromatic) resin. Aluminum flake (nominal median particle size of 36 micrometers) was added as a polystyrene masterbatch comprising 75 weight percent polystyrene and 25 weight percent aluminum flake based on the total weight of the masterbatch. Weights shown in Table 3 reflect the weight of the aluminum only. The composition additionally contained less than 3 weight percent additives (stabilizers, mold release agents, etc.). The compositions were molded into two inch (5.1 centimeters) by three inch (7.6 centimeters) plaques using the following molding conditions. Molding conditions IV: melt temp=210° C.; mold temp=54° C. Molding conditions V: melt temp=221° C.; mold temp=66° C. Molding conditions VI: melt temp=232° C.; mold temp=77° C. The plaques were then measured for gloss level at 60° using a BYK Gardner Haze/Gloss instrument. The composition was also tested for Notched Izod strength according to ASTM D256. Data is shown in Table 3, Notched Izod values are in joules per meter.

TABLE 3

|  | 7 | 8 | 9 |
|---|---|---|---|
| PPO | 50 | 50 | 50 |
| RDP | 20 | 20 | 20 |
| HIPS II | 30 | 30 | 30 |
| Al | 0.5 | 0.5 | 0.5 |
| PC SAN | 2 | 5 | 10 |
| 60° gloss at molding conditions IV | 11.8 | 11.2 | 9.3 |
| 60° gloss at molding conditions V | 14.4 | 16.5 | 15.9 |
| 60° gloss at molding conditions VI | 25 | 29.8 | 31.1 |
| Notched Izod | 75 | 54 | 43 |

*Comparative Examples

Examples 7–9 show that a low gloss finish can be obtained in compositions containing a fire retardant.

While preferred embodiments have been shown and described, various modifications and substitutions may be made thereto without departing from the spirit and scope of the invention. Accordingly, it is to be understood that the present invention has been described by way of illustration and not limitation. All of the U.S. Patent cited herein are incorporated herein by reference.

The invention claimed is:

1. A low gloss thermoplastic composition comprising poly(arylene ether), a rubber-modified poly(alkenyl aromatic) resin and an acrylonitrile containing polymer gel.

2. The composition of claim 1 wherein after molding the composition has a 60° C. gloss value less than or equal to about 60.

3. The composition of claim 2 wherein after molding the composition has a 60° C. gloss value less than or equal to about 50.

4. The composition of claim 2 wherein after molding the composition has a 60° C. gloss value less than or equal to about 30.

5. The composition of claim 1 wherein the rubber-modified poly(alkenyl aromatic) resin comprises about 70 to about 95 weight percent of the poly(alkenyl aromatic) resin and about 5 to about 30 weight percent of the rubber modifier.

6. The composition of claim 1 wherein the rubber-modified poly(alkenyl aromatic) resin comprises a rubber phase having rubber particles with an average size of about 0.5 to about 4.9 micrometers in diameter.

7. The composition of claim 1 further comprising polycarbonate.

8. The composition of claim 1 wherein the polymer gel is about 0.1 to about 5% crosslinked.

9. The composition of claim 1 further comprising polysiloxane microspheres.

10. The composition of claim 9 wherein the polysiloxane microspheres having a size distribution of about 0.5 to about 10 micrometers.

11. The composition of claim 1 further comprising a visual effects additive.

12. The composition of claim 11 wherein the visual effects additive comprises aluminum flake with an average particle size of about 5 to about 300 micrometers.

13. The composition of claim 12 wherein the visual effects additive comprises aluminum flake with an average particle size of about 5 to about 50 micrometers.

14. The composition of claim 1 further comprising a reinforcing agent.

15. The composition of claim 1 further comprising a flame retardant.

16. The composition of claim 1 further comprising an additive selected from the group consisting of antioxidants, mold release agents, UV absorbers, stabilizers, light stabilizers, lubricants, plasticizers, anti-static agents, blowing agents and combinations of two or more of the foregoing.

17. A method of molding an article having low gloss comprising molding a composition comprising poly(arylene ether), an acrylonitrile containing polymer gel, and a rubber-modified poly(alkenyl aromatic) resin at a melt temperature less than or equal to about 290° C. wherein the article has a 60° C. gloss value less than or equal to about 60.

18. The method of claim 17 wherein the article has a 60° C. gloss value less than or equal to about 50.

19. The method of claim 18 wherein the article has a 60° C. gloss value less than or equal to about 30.

20. The method of claim 17, further comprising using a mold temperature is less than or equal to about 90° C.

21. The method of claim 17, further comprising using an injection velocity of less than or equal to about 10.2 centimeters per second.

22. The method of claim 17, wherein the composition further comprises at least one visual effects additive.

23. A method of molding an article having low gloss comprising molding a composition comprising poly(arylene ether), a rubber-modified poly(alkenyl aromatic) resin, and a flame retardant, at a melt temperature less than or equal to about 221° C. wherein the article has a 60° C. gloss value less than or equal to about 60.

24. The method of claim 23 wherein the article has a 60° C. gloss value less than or equal to about 50.

25. The method of claim 24 wherein the article has a 60° C. gloss value less than or equal to about 30.

26. The method of claim 23, further comprising using a mold temperature less than or equal to about 65° C.

27. The method of claim 23, further comprising an injection velocity of less than or equal to about 10.2 centimeters per second.

28. The method of claim 23, wherein the composition further comprises an acrylonitrile containing polymer gel.

29. The method of claim 23, wherein the composition further comprises at least one visual effects additive.

30. A method of molding an article having low gloss comprising molding a composition comprising poly(arylene ether), a rubber-modified poly(alkenyl aromatic) resin and an acrylonitrile containing polymer gel at a melt temperature of about 260 to about 315° C. wherein the article has a 60° C. gloss value less than or equal to about 60.

31. The method of claim 30 wherein the article has a 60° C. gloss value less than or equal to about 50.

32. The method of claim 31 wherein the article has a 60° C. gloss value less than or equal to about 30.

33. The method of claim 30, further comprising using a mold temperature less than or equal to about 90° C.

34. The method of claim 30, further comprising an injection velocity of less than or equal to about 10.2 centimeters per second.

35. The method of claim 30, wherein the composition further comprises at least one visual effects additive.

36. A method of molding an article having low gloss comprising molding a composition comprising poly(arylene ether), a rubber-modified poly(alkenyl aromatic) resin, a flame retardant, and an aciylonitrile containing polymer gel at a melt temperature of about 204° C. to about 232° C. wherein the article has a 60° C. gloss value less than or equal to about 60.

37. The method of claim 36 wherein the article has a 60° C. gloss value less than or equal to about 50.

38. The method of claim 36 wherein the article has a 60° C. gloss value less than or equal to about 30.

39. The method of claim 36, further comprising using amold temperature less than or equal to about 65° C.

40. The method of claim 36, further comprising an injection velocity of less than or equal to about 10.2 centimeters per second.

41. The method of claim 36, wherein the composition further comprises at least one visual effects additive.

42. An article comprising poly(arylene ether), a rubber-modified poly(alkenyl aromatic) resin and an acrylonitrile polymer gel wherein the article has a 60° C. gloss value less than or equal to about 60.

43. The article of claim 42 wherein the 60° C. gloss value is less than or equal to about 50.

44. The article of claim 43 wherein the 60° C. gloss value is less than or equal to about 30.

45. The article of claim 42 further comprising polysiloxane microspheres.

46. The article of claim 42 further comprising aluminum flake having an average particle size of about 5 to about 50 micrometers.

47. The article of claim 46 wherein the article has a 60° C. gloss value less than or equal to about 30.

48. A low gloss thermoplastic composition consisting essentially of poly(arylene ether), a rubber-modified poly(alkenyl aromatic) resin and an acrylonitrile containing polymer gel.

49. A low gloss thermoplastic composition consisting essentially of poly(arylene ether), a rubber-modified poly(alkenyl aromatic) resin, a fire retardant and an acrylonitrile containing polymer gel.

50. A low gloss thermoplastic composition consisting essentially of poly(arylene ether), a rubber-modified poly(alkenyl aromatic) resin, at least one visual effects additive and an acrylonitrile containing polymer gel.

51. A low gloss thermoplastic composition consisting essentially of poly(arylene ether), a rubber-modified poly(alkenyl aromatic) resin, a fire retardant, at least one visual effects additive, and an acrylonitrile containing polymer gel.

* * * * *

UNITED STATES PATENT AND TRADEMARK OFFICE
CERTIFICATE OF CORRECTION

PATENT NO.         : 7,205,342 B2                                          Page 1 of 1
APPLICATION NO. : 10/723198
DATED              : April 17, 2007
INVENTOR(S)        : Gerus et al.

It is certified that error appears in the above-identified patent and that said Letters Patent is hereby corrected as shown below:

Column 1:
Line 25, after "effects " insert -- such as sparkle, glitter, brushed metal, metal-like look, true metal appearance and --

Column 15:
Line 12, before "temperature" delete "amold" and insert therefor -- a mold --

Signed and Sealed this

Seventeenth Day of July, 2007

JON W. DUDAS
*Director of the United States Patent and Trademark Office*